United States Patent [19]
Axelsson

[11] 3,891,067
[45] June 24, 1975

[54] CLEARANCE-SENSING SLACK ADJUSTER FOR A VEHICLE BRAKE-ACTUATING PNEUMATIC CYLINDER-PISTON UNIT

[75] Inventor: Lars Bengt Axelsson, Malmo, Sweden

[73] Assignee: Svenska Aktiebolaget Bromsregulator, Malmo, Sweden

[22] Filed: June 17, 1974

[21] Appl. No.: 480,035

Related U.S. Application Data

[63] Continuation-in-part of Ser. No. 423,676, Dec. 11, 1973, abandoned.

[30] Foreign Application Priority Data

Dec. 15, 1972 United Kingdom............. 57896/72

[52] U.S. Cl.............................. 188/196 D; 188/203
[51] Int. Cl............................................ F16d 65/56
[58] Field of Search ....... 188/71.9, 196 D, 202, 203

[56] References Cited
UNITED STATES PATENTS
3,442,357  5/1969  Farr.................. 188/196 D
3,744,596  7/1973  Sander................. 188/203
3,757,906  9/1973  Baezold.............. 188/196 D FOREIGN PATENTS OR APPLICATIONS
916,516  1/1963  United Kingdom........... 188/196 D Primary Examiner—Duane A. Reger
Attorney, Agent, or Firm—Laurence R. Brown

[57] ABSTRACT

A clearance-sensing slack adjuster operated by an air cylinder brake application stroke has two linearly disposed spindles axially aligned. A screw threaded adjuster spindle is rotatably mounted in a rotationally immovable adjustment nut with a clearance space separating the spindle end in a normal position from the end of the other push spindle member which is rotatable within the brake push rod, so that the two spindles members can axially engage each other and rotate in a direction selected by one way clutch arrangements to adjust slack on the return stroke. Means is provided to prevent adjustment during the elasticity part of the release stroke. The screw threads of the two spindles have the same pitch but different diameters so that only the adjuster nut is non-self-locking.

6 Claims, 1 Drawing Figure

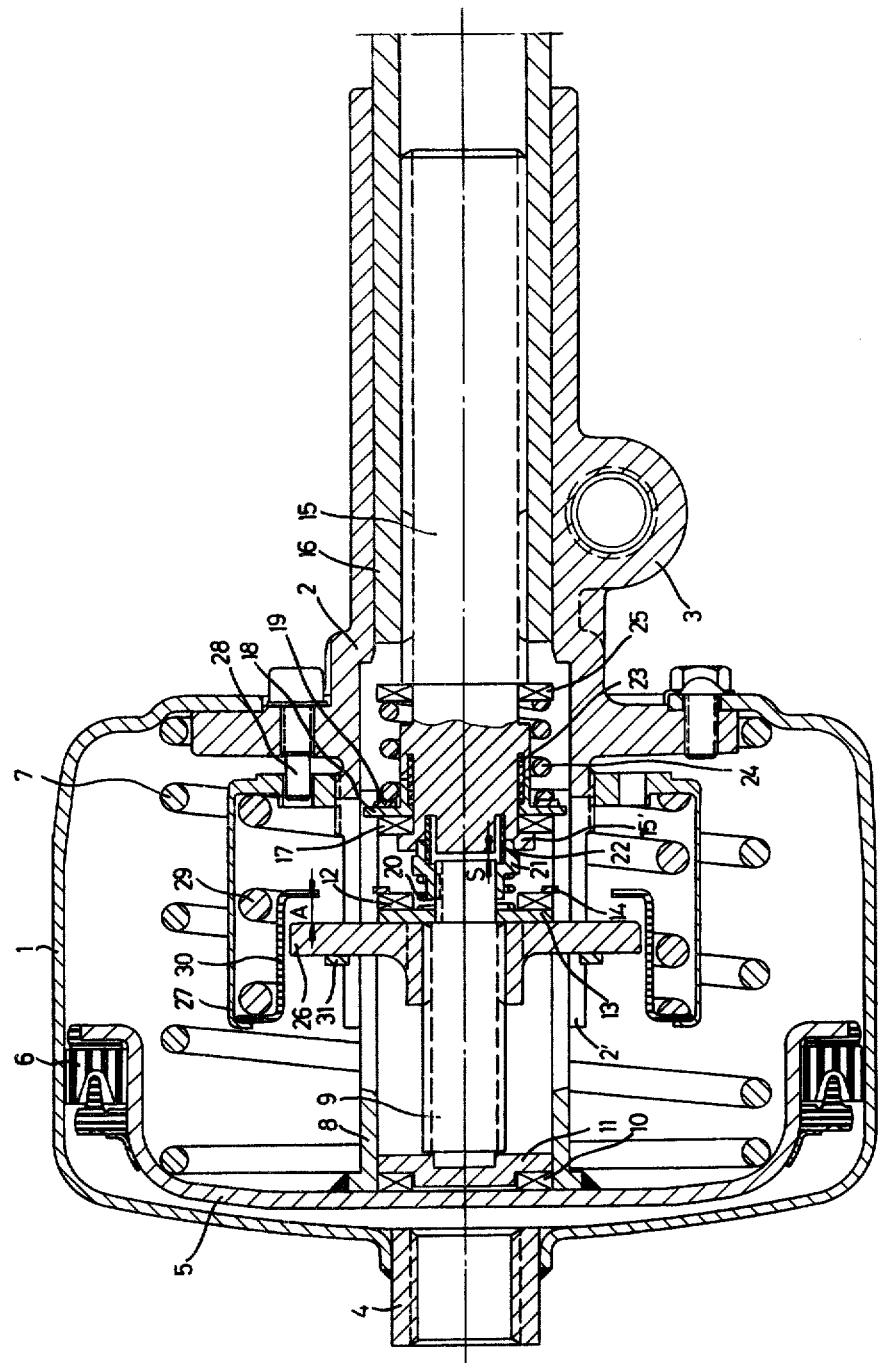

CLEARANCE-SENSING SLACK ADJUSTER FOR A VEHICLE BRAKE-ACTUATING PNEUMATIC CYLINDER-PISTON UNIT

This application for U.S. Pat. is a continuation-in-part of Ser. No. 423,676 filed Dec. 11, 1973, now abandoned.

This invention relates to a clearance-sensing slack-adjuster, preferably built into a vehicle brake-actuating pneumatic cylinder-piston unit, including a force-receiving piston rod and a force-delivering push rod, both rods being substantially tubular and only axially movable in a fixed adjuster housing. As mentioned a slack-adjuster of this kind preferably is built into a vehicle brake-actuating pneumatic cylinder-piston unit, and thus only its use in such units will be mentioned below. However, it is to be noted that it can be used in other cases.

A couple of such slack-adjusters are already known but they all suffer from disadvantages of different kinds, including the disadvantages of being too expensive or too voluminous and/or heavy.

There are functionally several different slack-adjusters for such brake-units, and this invention relates to a single-acting slack-adjuster working according to the clearance-sensing principle and eliminating all excessive slack during one return stroke of the piston in the unit. The object of the invention is to accomplish such a slack-adjuster which is extremely reliable and of simple design. The slack-adjuster shall further be small and light-weight and also cheap to manufacture. The slack-adjuster shall finally have a very long life and shall be very insensitive to shocks and vibrations.

These and other objects are attained in that the slack-adjuster is characterised by an externally screw-threaded adjuster spindle rotationally journalled in the piston rod and threadingly engaging a rotationally immovable adjuster nut and an externally screw-threaded push spindle threadingly engaging the push rod, the screw-thread pitches of the two spindles being identical but the diameter of the adjuster spindle being so much less than that of the push spindle that the engagement between the adjuster spindle and the adjuster nut is non-self-locking, and also by means joining the two spindles and transmitting rotational movement from the adjuster spindle to the push spindle at their axial movement in the direction opposite the force delivering direction provided that the movement of the adjuster nut has exceeded a set control distance during the preceding force delivering.

The invention will be described more detailed hereinafter, reference being made to the accompanying drawing showing a sectional view of a cylinder piston unit incorporating a slack-adjuster according to the invention.

A cylinder 1 is bolted to a cylindrical and substantially tubular adjuster housing 2 which is to be attached to the underframe of a vehicle, preferably a railway car, by means of a lug 3. The cylinder 1 is provided with an inlet 4 for compressed air.

A piston 5 is arranged in the cylinder 1, and there is a sealing 6 around the former. A helical compression return-spring 7 is provided between the piston and the cylinder bottom. A piston rod 8 in the form of a partly longitudinally-slotted tube is welded to the piston 5. A screw-threaded adjuster spindle 9 is rotatably but axially immovably journalled in relation to the piston rod 8 by means of on one hand a first anti-friction thrust bearing 10 and a thrust plate 11 and on the other hand a second anti-friction thrust bearing 12, a bearing ring 13 and a first locking ring 14 in the piston rod 8. The bearing ring 13 is cooperating with a shoulder on the adjuster spindle 9 so as to keep the latter from moving axially.

A screw-threaded push spindle 15 is threadingly engaging a tubular push rod 16, which is axially movable in the adjuster housing 2 but is held against rotation by being connected to further parts of the brake rigging (not shown). The push spindle 15 is rotatably journalled in the tubular piston rod 8 by means of a third anti-friction thrust bearing 17 arranged between a flange 15' on the push spindle 15 and a locking collar 18, which is held against rotation by engaging the slotted piston rod 8 and is backed by a second locking ring 19 in the piston rod 8.

There is normally a small distance $S$ between the adjuster spindle 9 and the push spindle 15, and relative rotation between these two parts is prevented in one direction by a first one-way clutch arrangement consisting of a backing spring 20, a locking sleeve 21 and a first locking spring 22. The mutual arrangement of these clutch parts is clear from the drawing, but it is to be noted that the locking sleeve 21 only is axially movable on the adjuster spindle 9 by means of a key and keyway arrangement.

The push spindle 15 is kept from rotating in one direction in relation to the piston rod 8 by the cooperation between the rotationally immovable locking collar 18, a second locking spring 23 and the push spindle 15 together constituting a second one-way clutch. There is also a helical compression coupling spring 24 arranged between the second locking ring 19 and a fourth anti-friction thrust bearing 25 held against a shoulder on the push spindle 15.

The piston rod 8 is guided in a tubular slotted extension 2' of the adjuster housing 2. The piston rod 8 is held against rotation in the adjuster housing 2 by means of a fingered adjuster nut 26 threadingly engaging the adjuster spindle 9.

A spring sleeve 27 is threaded on to the adjuster housing extension 2' and can be locked in relation thereto by means of a bolt 28. A helical compression counter-spring 29 is arranged in the spring sleeve 27 and is actuatable by a control distance sleeve 30, which together with the adjuster nut 26 defines a control distance $A$. On the other side of the adjuster nut 26 there is a stopping ring 31 in the form of a locking ring attached to the adjuster housing extension 2'.

By unscrewing the bolt 28 and turning the spring sleeve 27 it is possible to adjust the control distance $A$ to the desired value.

A very important feature is that the adjuster spindle 9 and the push spindle 15 have the same screw-thread pitch but different diameters. These diameters are so chosen that the screw-thread of the adjuster spindle 9 in non-self-locking whereas the screw-thread of the push spindle 15 is self-locking. Due to the conforming screw-thread pitches the adjuster nut 26 and the push rod 16 are moving with the same speeds on the respective spindles 9 and 15, and the whole of any excessive slack is taken up during one braking operation as will be clear from the description hereinafter.

It is also to be noted that functionally the locking direction for the first locking spring 22 is opposite the locking direction for the second locking spring 23 of reasons also appearing from the description hereinafter.

If there is any excessive slack between the brake lining or pad and the wheel or brake disc the force transmission will be as follows during a brake application stroke, i.e. when compressed air is let into the cylinder 1 through the inlet 4.

In the beginning of the application stroke the piston 5, the whole mechanism inside the unit and the push rod 16 will move forward, i.e. towards the right in the FIGURE. The force transmission will in this case be from the piston 5 via the piston rod 8, the second locking ring 19, the coupling spring 24, the fourth thrust bearing 25 and the push spindle 15 to the push rod 16.

When the piston 5 has moved a distance corresponding to the set control distance A the forward movement of the adjuster nut 26 will be stopped so that on further movement forward the adjuster spindle 9 will rotate in the adjuster nut 26 due to the non-self-locking engagement between this nut and the adjuster spindle 9. This rotation is in the non-locking direction for the first locking spring 20, and thus no torque is transmitted to the push spindle 15 which moreover is locked against rotation in this direction by the second locking spring 23.

After the brake lining or pad has been applied to the wheel or disc there will be a counter force in the push rod 16 and the push spindle 15 causing such a compression of the coupling spring 24 that the two spindles will contact each other (eliminating the distance S). The force transmission will now be from the piston 5 via the first thrust bearing 10, the thrust plate 11, the adjuster spindle 9, and the push spindle 15 to the push rod 16. Further movement forward of the mechanism is still possible due to the elasticity and distorsion and play in the brake rigging. During this elasticity part the adjuster spindle 9 is unable to rotate in the adjuster nut 26 due to the engagement between the two spindles 9 and 15 under the influence of the brake force. Instead the adjuster nut 26 will follow the adjuster spindle 9 forward (to the right in the FIGURE) under compression of the counter-spring 29. It is thus clear that when the brake is fully applied the adjuster nut 26 has been moved a distance backwards (to the left in the FIGURE) on the adjuster spindle 9 corresponding to the excessive slack.

During the first part or elasticity part of the release stroke the brake lining or pad will still be in contact with the wheel or disc. At first during this elasticity part of the release stroke the counter-spring 29 will expand, and when there is no more elasticity the coupling spring 24 will expand. The adjuster nut 26 will keep its position on the adjuster spindle 9 and follow the latter backwards until it is stopped by the stopping ring 31.

During the continued backward movement of the mechanism the adjuster nut 26 is kept immovable whereas the adjuster spindle 9 is rotating in it. This rotation is in the locking direction or torque transmitting direction of the first locking spring 22 which means that the rotation is transmitted to the push spindle 15. (The push spindle 15 is not locked against rotation in this direction by the second locking spring 23.) The rotation of the push spindle 15 has the effect that the push rod 16 is moving to the right in the FIGURE or with other words that slack-adjusting is taking place. This slack-adjusting continues until the mechanism has reached its shown starting position, and at that time the whole excessive slack has been taken up.

If there is no excessive slack the lining or pad will be applied to the wheel or disc and the two spindles 9 and 15 will contact each other at the same moment as the adjuster nut 26 has moved the set control distance A and has reached the control distance sleeve 30. The adjuster spindle 9 will thus not rotate during a normal brake application, and no slackadjusting will take place.

If the adjuster spindle 9 of some reason or another (for example that the grease has become stiff owing to very low temperature) is unable to rotate in the adjuster nut 26 during the application stroke the adjuster nut 26 will follow the adjuster spindle 9 forward during the whole application stroke under compression of the counter-spring 29. This means that no slack-adjusting will take place in spite of any excessive slack. On the other hand full brake force will always be obtained under all circumstances which of course is very important.

The illustrated and described slack-adjuster in the cylinder-piston unit is single-acting and serves for eliminating all excessive slack in one braking operation (during the return stroke). The adjuster has a "clearance-sensing" ability for taking the elasticity and other characteristics of the brake rigging into account.

When the brake lining or pad has worn out and a new one has to be fitted it is only necessary to return the push rod 16 to its initial position as shown by manually screwing in this push rod after having released it from the part (not shown) which prevents it from rotating, for example from the brake shoe head or other part of the brake rigging to which the push rod 16 is normally connected.

In a further embodiment of the invention the screwthread pitches of the two spindles need not be identical. Thus, the adjuster spindle 9 may have a screw-thread pitch of 18 mm and the push spindle 15 a pitch of 16 mm for example. This means that not all excessive slack is eliminated in one operation but 16/18 of it, so that if the pitch difference is not too great for all practical purposes the functioning of the device is not seriously changed and the advantages of working with different pitches is afforded.

What is claimed is:

1. A clearance-sensing slack-adjuster having a force delivering stroke direction, preferably built into a vehicle brake-actuating pneumatic cylinder-piston unit, including a force-receiving piston rod and a force-delivering push rod, both rods being substantially tubular and only axially movable in a fixed adjuster housing comprising in combination, an externally screw-threaded adjuster spindle rotationally journalled in the piston rod, a rotationally immovable adjuster nut in said housing about and threadingly engaging said spindle for axial movement therealong, an externally screw-threaded push spindle threadingly engaging the push rod, the diameter of the adjuster spindle being so much less than that of the push spindle that the engagement between the adjuster spindle and the adjuster nut is non-self-locking whereas the engagement between the push spindle and the push rod is self-locking, and means joining the two spindles and transmitting rotational movement from the adjuster spindle to the push spindle at their axial movement in the direction opposite the force delivering direction provided that the axial movement of the adjuster nut has exceeded a set control threshold distance (A) during the preceding force delivering stroke.

2. A slack-adjuster according to claim 1, characterised by a first locking spring connecting the two spindles and a second locking spring connecting the push spindle to the piston rod, the locking directions for these two locking springs being opposite to each other.

3. A slack-adjuster according to claim 1, characterised by a coupling spring between the piston rod and the push spindle permitting movement of the push spindle into contact with the adjuster spindle after the exceeding of a certain force on the coupling spring.

4. A slack-adjuster according to claim 1, characterised by a control distance sleeve defining said control distance (A) with the adjuster nut and movable in the force delivering direction against the action of a counter-spring.

5. A slack-adjuster according to claim 4, characterised by a stopping ring in the adjuster housing forming a stop for the adjuster nut relative to the adjuster housing at the axial movement of the adjuster nut in the direction opposite the force delivering direction.

6. A slack-adjuster according to claim 1, wherein the screw-thread pitches of the two spindles are different.

* * * * *